(12) United States Patent
Liang

(10) Patent No.: US 11,900,946 B2
(45) Date of Patent: Feb. 13, 2024

(54) VOICE RECOGNITION METHOD AND ELECTRONIC DEVICE USING THE SAME

(71) Applicant: ASUSTeK COMPUTER INC., Taipei (TW)

(72) Inventor: Pei-Lin Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/381,267

(22) Filed: Jul. 21, 2021

(65) Prior Publication Data

US 2022/0036902 A1    Feb. 3, 2022

(30) Foreign Application Priority Data

Jul. 28, 2020    (TW) .................. 109125475

(51) Int. Cl.
  *G10L 17/02*    (2013.01)
  *G10L 25/51*    (2013.01)
  *G10L 15/08*    (2006.01)

(52) U.S. Cl.
  CPC .............. *G10L 17/02* (2013.01); *G10L 15/08* (2013.01); *G10L 25/51* (2013.01)

(58) Field of Classification Search
  CPC .......... G10L 17/02; G10L 15/08; G10L 25/51
  See application file for complete search history.

(56) References Cited

U.S. PATENT DOCUMENTS 11,189,263 B2* 11/2021 Ma .......................... G10L 15/22
2016/0358599 A1  12/2016 Wang
2018/0144742 A1* 5/2018 Ye ........................... G10L 15/20
2019/0341055 A1* 11/2019 Krupka .................. G10L 25/84
2020/0294509 A1* 9/2020 Cai ........................ G06K 9/6218

(Continued)

FOREIGN PATENT DOCUMENTS

CN      102222500 A    10/2011
CN      105989849 A    10/2016

(Continued)

OTHER PUBLICATIONS

Lu et al., "SCAN: Learning Speaker Identity from Noisy Sensor Data," 2017 16th ACM/IEEE International Conference on Information Processing in Sensor Networks (IPSN), 2017, pp. 67-78. (Year: 2017).*

(Continued)

*Primary Examiner* — Michelle M Koeth
(74) *Attorney, Agent, or Firm* — McClure, Qualey & Rodack, LLP

(57) ABSTRACT

A voice recognition method is provided. The voice recognition method includes: collecting a plurality of voice signals; extracting the voiceprint features of each of the voice signals; performing a data process on the voiceprint features, to convert the voiceprint features into a N-dimensional matrix, and N is an integer greater than or equal to 2; performing a feature normalization process on the N-dimensional matrix to obtain a plurality of voiceprint data; classifying the voiceprint data to generate a clustering result; finding out a centroid of each cluster according to the clustering result, and registering the voiceprint data adjacent to each of the centroid. The disclosure also provides an electronic device that adapted for the voice recognition method.

12 Claims, 8 Drawing Sheets

(56) References Cited

U.S. PATENT DOCUMENTS

2021/0326421 A1* 10/2021 Khoury .................. G10L 17/08
2021/0390959 A1* 12/2021 Jain ........................ G10L 17/06

FOREIGN PATENT DOCUMENTS

| CN | 108091323 A | * | 5/2018 | ............ G10L 15/02 |
| CN | 108763420 A | | 11/2018 | |
| CN | 109637547 A | * | 4/2019 | ........... G06K 9/6218 |
| CN | 109785825 A | | 5/2019 | |
| CN | 109960799 A | | 7/2019 | |
| CN | 111009262 A | | 4/2020 | |
| EP | 3483761 A1 | | 10/2017 | |

OTHER PUBLICATIONS

Lerato L, Niesler T (2015) Clustering Acoustic Segments Using Multi-Stage Agglomerative Hierarchical Clustering. Plos One 10(10): e0141756. doi:10.1371/journal.pone.0141756 (Year: 2015).*
English Machine Translation of CN 108091323-A (Year: 2018).*
Halkidi et al., (2001). On Clustering Validation Techniques. Journal of Intelligent Information Systems. 17. 10.1023/A: 1012801612483. (Year: 2001).*
Moreno, "Data Normalization with Pandas and Scikit-Learn," Towardsdatascience.com, Jul. 20, 2020 (available at "https://towardsdatascience.com/data-normalization-with-pandas-and-scikit-learn-7c1cc6ed6475," last accessed May 8, 2023) (Year: 2020).*

* cited by examiner

VOICE RECOGNITION METHOD AND ELECTRONIC DEVICE USING THE SAME

CROSS-REFERENCE TO RELATED APPLICATION

This application claims the priority benefit of Taiwan applications serial No. 109125475, filed on Jul. 28, 2020. The entirety of the above-mentioned patent application is hereby incorporated by reference herein and made a part of specification.

BACKGROUND OF THE INVENTION

Field of the Invention

The invention relates to a voice recognition method and an electronic device using the same.

Description of the Related Art

The development of voice recognition models usually require a large number of people providing voice to establish a voice database, which requires a lot of labor costs, and the trained voice model also needs to be registered by the user to perform a subsequent voice recognition. In addition, the verification accuracy of the experimental data of the sound model is often very different from the actual verification data. The actual accuracy is affected by the user's voice status, voice size, and environmental noise, which is a bottleneck in the accuracy of voice recognition.

BRIEF SUMMARY OF THE INVENTION

According to the first aspect, a voice recognition method is provided. The voice recognition method includes: collecting a plurality of voice signals; extracting voiceprint features of each of the voice signals; performing a data process on the voiceprint features, to convert the voiceprint features into a N-dimensional matrix, and N is an integer greater than or equal to 2; performing a feature normalization process on the N-dimensional matrix to obtain a plurality of voiceprint data; classifying the voiceprint data to generate a clustering result; finding out a centroid of each cluster according to the clustering result, and registering the voiceprint data adjacent to each of the centroid.

According to the first aspect, an electronic device is also provided. The electronic device includes a sound receiver and a processor. The sound receiver is used to collect a plurality of voice signals. The processor is electrically connected to the sound receiver. The processor is configured for extracting voiceprint features of each of the voice signals; performing a data process on the voiceprint features to convert the voiceprint features into a N-dimensional matrix, where N is an integer greater than or equal to 2; performing a feature normalization process on the N-dimensional matrix to obtain a plurality of voiceprint data; classifying the voiceprint data to generate a clustering result; and finding out a centroid of each cluster according to the clustering result, and registering the voiceprint data adjacent to the centroid.

In summary, the user's voiceprint data is registered and accurately recognized through a small amount of voice signals, and the voiceprint data is classified and recognized through the voice signals of the user's actual using environment. Therefore, the problem of the process that needs users to provide voices to register and the problem of inconsistency between the experimental data and the actual verification data are solved, and then the accuracy of recognition is improved.

DETAILED DESCRIPTION OF THE EMBODIMENTS

Figure 1:
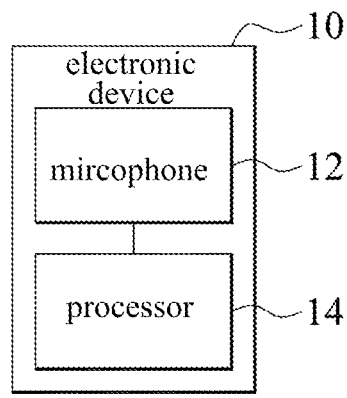
FIG. 1 is a block schematic diagram of an electronic device according to an embodiment.

FIG. 1 is a block schematic diagram of an electronic device according to an embodiment. Please refer to FIG. 1. An electronic device 10 includes at least one sound receiver and a processor 14. In an embodiment, the sound receiver senses and collects the voice signal from the user. The processor 14 is electrically connected to the sound receiver to receive a voice signal, and performs a subsequent recognition and application according to the voice signal. In an embodiment, the sound receiver is a microphone 12, and the electronic device 10 is a notebook computer, a mobile phone, a personal digital assistant (PDA), a tablet computer, a desktop computer, a navigation device, or other electronic devices with computing capabilities, which is not limited herein. In an embodiment, the processor 14 is a central processing unit or a microprocessor.

Figure 2:
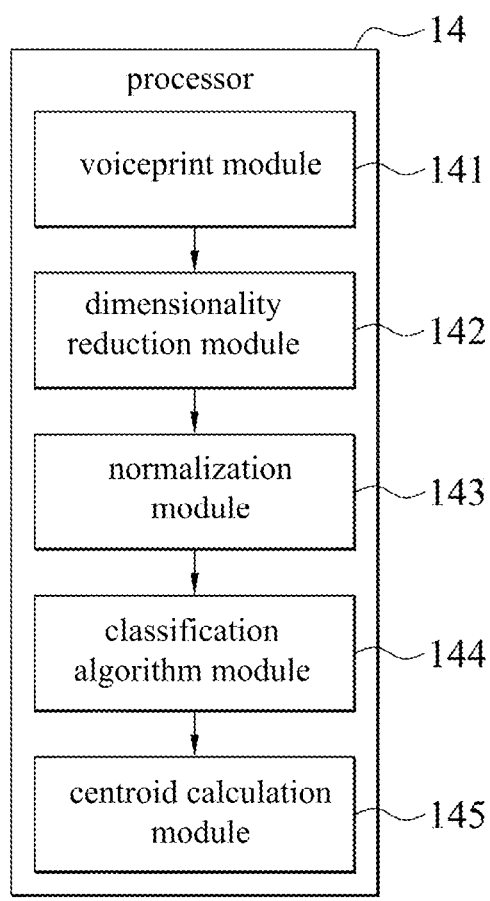
FIG. 2 is a schematic diagram showing a system architecture of a processor according to an embodiment.

In an embodiment, the software architecture in the processor 14 is shown in FIG. 2. The processor 14 includes a voiceprint module 141, a dimensionality reduction module 142, a normalization module 143, a classification algorithm module 144 and a centroid calculation module 145. The voiceprint module 141 is connected to the dimensionality reduction module 142, the dimensionality reduction module 142 is connected to the normalization module 143, the normalization module 143 is connected to the classification algorithm module 144, and the classification algorithm module 144 is connected to the centroid calculation module 145.

Figure 3:
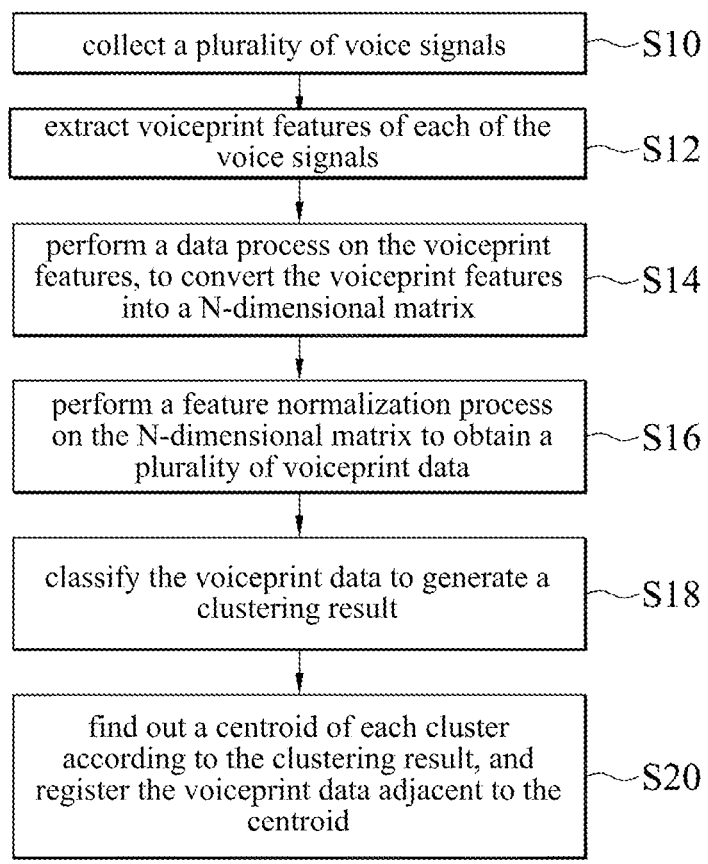
FIG. 3 is a flow schematic diagram of a voice recognition method according to an embodiment.

FIG. 3 is a flow schematic diagram of a voice recognition method according to an embodiment. Please refer to FIG. 1 to FIG. 3. The processor 14 is used to perform a voice recognition method including step S10 to S20. First, as shown in step S10, the processor 14 collects a plurality of voice signals by the microphone 12, and transmits the voice signals received by the microphone 12 to the voiceprint module 141. As shown in step S12, the voiceprint module 141 extracts voiceprint feature of each of the voice signals to obtain a plurality of voiceprint features. In an embodiment, the voiceprint module 141 performs a training process through an existing public voiceprint database.

As shown in step S14, transmits the voiceprint features obtained by the voiceprint module 141 to the dimensionality reduction module 142. The dimensionality reduction module 142 performs a data process on the voiceprint features to arrange and to convert the voiceprint features of the user from the same microphone 12 into an N-dimensional matrix, where N is an integer greater than or equal to 2. In an embodiment, the dimensionality reduction module 142 uses a t-distributed stochastic neighbor embedding (t-SNE) method to perform a dimensionality reduction process to obtain the N-dimensional matrix correspondingly. In an embodiment, the N-dimensional matrix is a two-dimensional matrix or a matrix with more than two dimensions.

As shown in step S16, the normalization module 143 performs a feature normalization process on the N-dimensional matrix, to scale the voiceprint features proportionally to fall within a specific interval to obtain a plurality of the voiceprint data. In an embodiment, the normalization module 143 performs a feature standardization process using the methods such as a standardization method, a mean removal method, and a variance scaling method.

Figure 4:
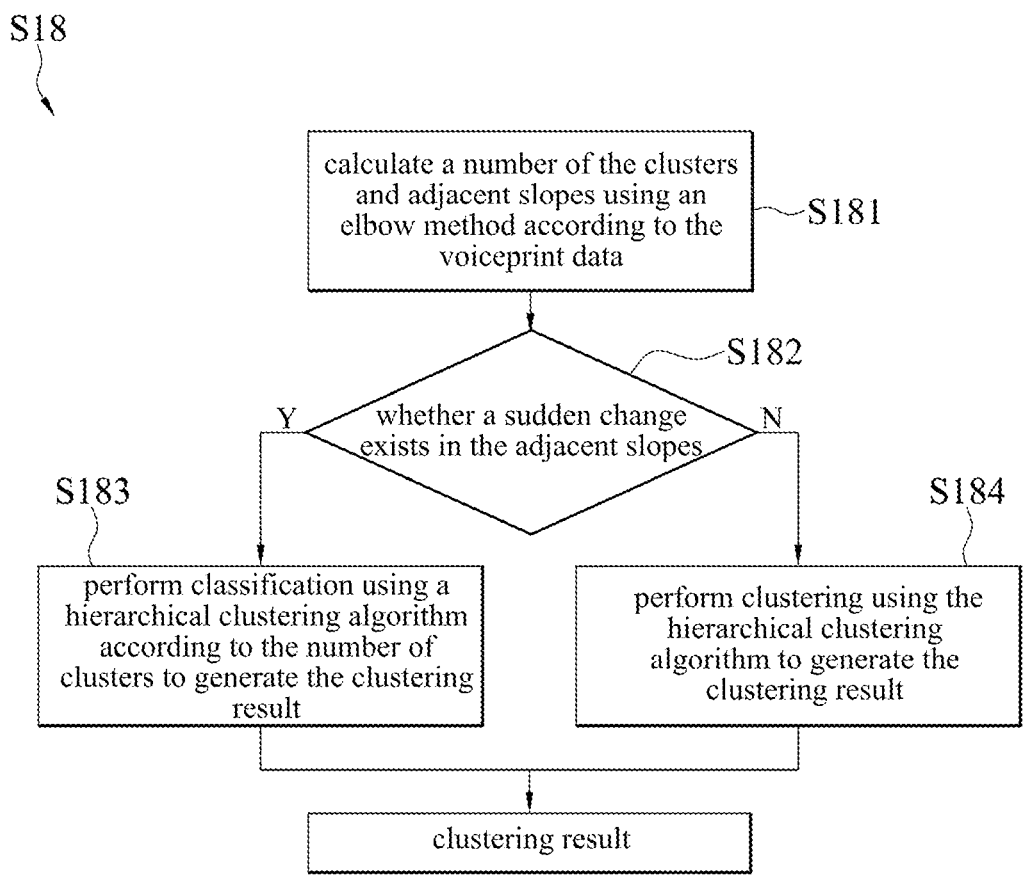
FIG. 4 is a flow schematic diagram showing classifying the voiceprint data according to an embodiment.

The voiceprint data processed by the normalization module 143 is transmitted to the classification algorithm module 144, as shown in step S18, the classification algorithm module 144 performs the step of classifying on the voiceprint data to dynamically adjust a classifying threshold value according to the voiceprint features, and generates a clustering result. The clustering result includes a plurality of clusters. The step of classifying all the voiceprint data in step S18 is further shown in step S181 to step S184 of FIG. 4. Please refer to FIG. 4 at the same time, as shown in step S181, the classification algorithm module 144 calculates a number of the clusters and the adjacent slopes using an elbow method according to the voiceprint data. As shown in step S182, the classification algorithm module 144 determines whether a sudden change exists in the adjacent slopes. When the sudden change exists in the slopes, refer to FIG. 5A, the slope changes suddenly when the number of the clusters is 6, so it is concluded that the number of the clusters is 6. As shown in step S183, the classification algorithm module 144 performs classification using a hierarchical clustering algorithm according to the number of the clusters. That is, when the slope changes suddenly, the classification algorithm module 144 applies the number of the clusters obtained by the elbow method to the hierarchical clustering algorithm, and performs classification by the hierarchical clustering algorithm to generate a clustering result. As shown in FIG. 6A, the clustering result includes 6 clusters numbered 0 to 5. In the embodiment, since the cluster with number 5 is not concentrated, ignores the cluster and outputs a clustering result with 5 clusters. Please refer to FIG. 5B at the same time. When the slope does not change suddenly, as shown in step S184, the number of the clusters is not used, and the classification algorithm module 144 directly performs classification by the hierarchical clustering algorithm to generate the clustering result. As shown in FIG. 6B, the clustering result includes 5 clusters numbered 0~4. In one embodiment, the hierarchical clustering algorithm is a balanced iterative reducing and clustering using hierarchies (BIRCH) algorithm.

Figure 5A:
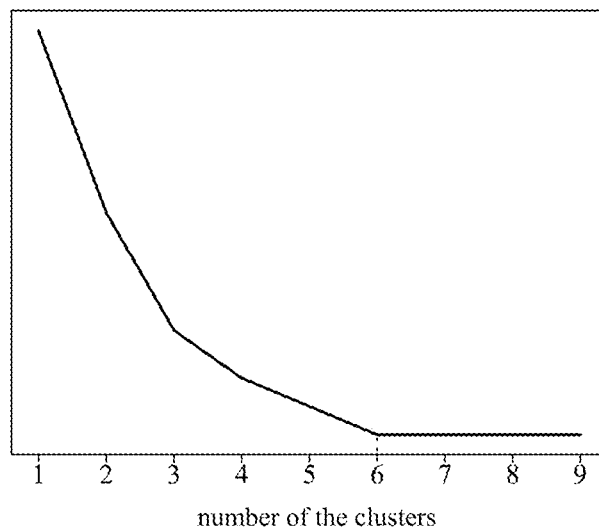
FIG. 5A is a schematic diagram of a curve showing a sudden change in the slope according to an embodiment.
Figure 5B:
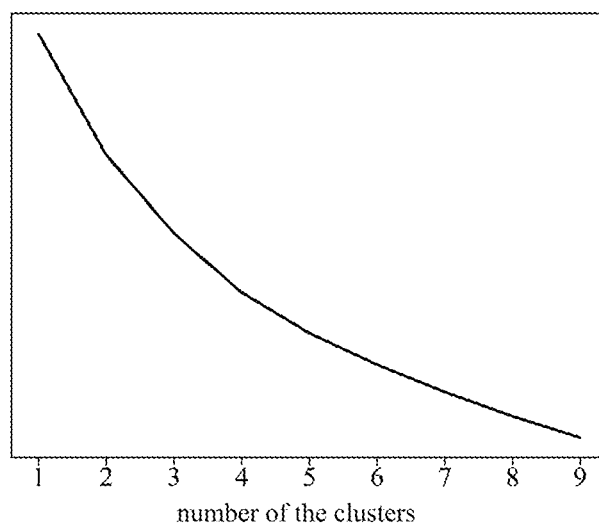
FIG. 5B is a schematic diagram of a curve without sudden change in the slope according to an embodiment.
Figure 6A:
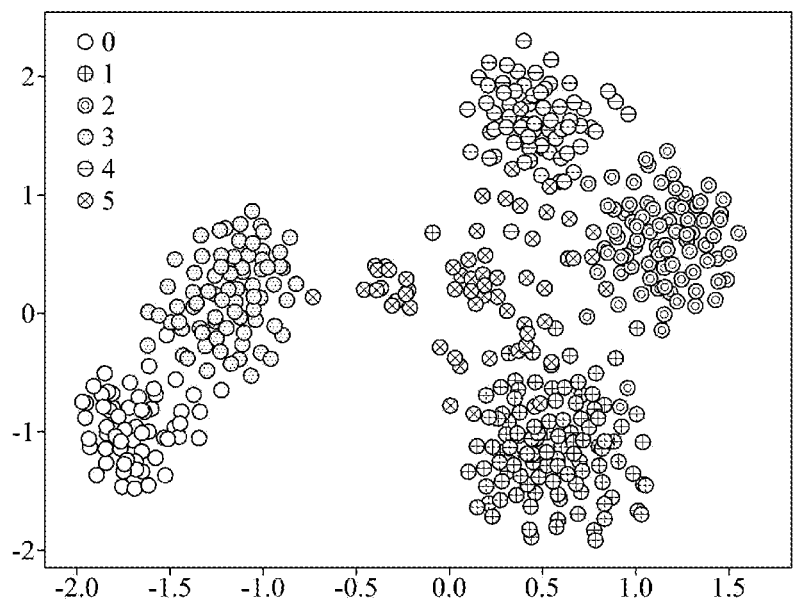
FIG. 6A is a schematic diagram of a clustering result of classification using an elbow method and a hierarchical clustering algorithm according to an embodiment.
Figure 6B:
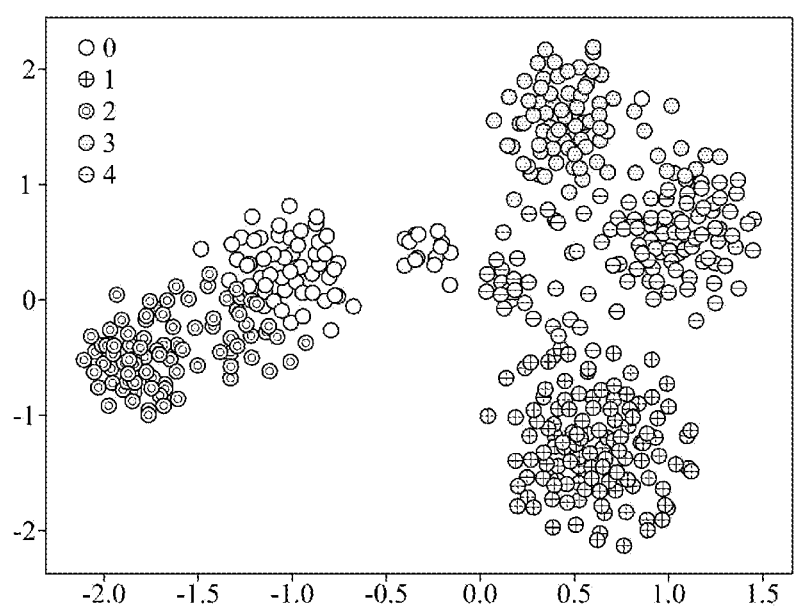
FIG. 6B is a schematic diagram of a clustering result of classification using a hierarchical clustering algorithm according to an embodiment.

The schematic diagram of a slope curve in FIG. 5A, 5B and the schematic diagram of a clustering result FIG. 6A, 6B are only to illustrate the specific implementation aspects of the technical content of the disclosure. Whether a sudden change exists, or the number of the clusters of the clustering results is showed as different results according to the actual situation, which is not limited herein.

Please refer to FIG. 1 to FIG. 3. After generating the clustering result, as shown in step S20, the centroid calculation module 145 finds out a centroid (central point) of each cluster according to the clustering result, and registers the voiceprint data adjacent to each centroid. For example, if there are 5 clusters, the centroid of each cluster and a plurality of the voiceprint data adjacent to the centroid are found and the voiceprint data adjacent to each centroid and an identification number of voiceprint data are recorded. In an embodiment, since each cluster has a centroid and the centroid is the most representative tuple in the corresponding cluster, the method of determining a cluster centroid includes: calculating the mathematical average tuple of each cluster, and then finding out the tuple closest to the average tuple in each cluster as the cluster centroid.

Figure 7:
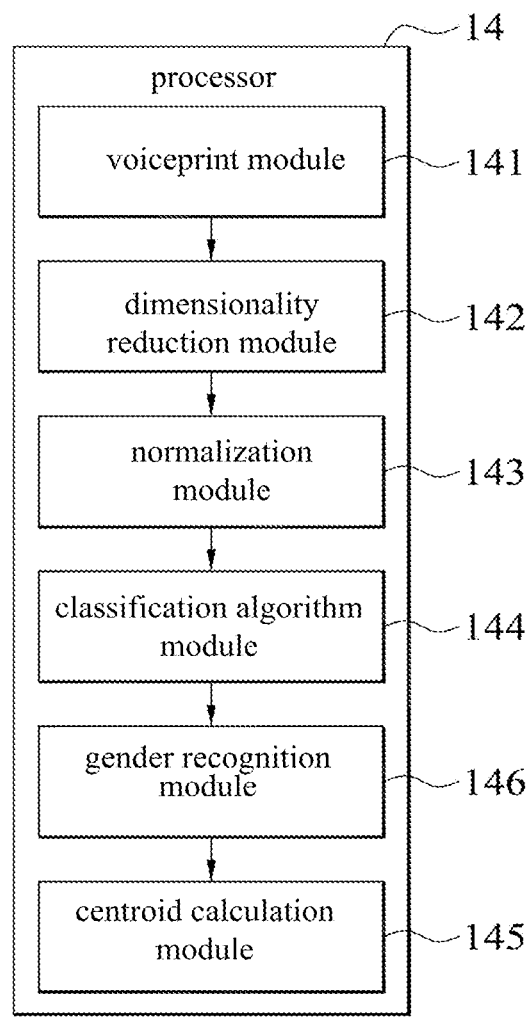
FIG. 7 is a schematic diagram showing a system architecture of a processor according to another embodiment.
Figure 8:
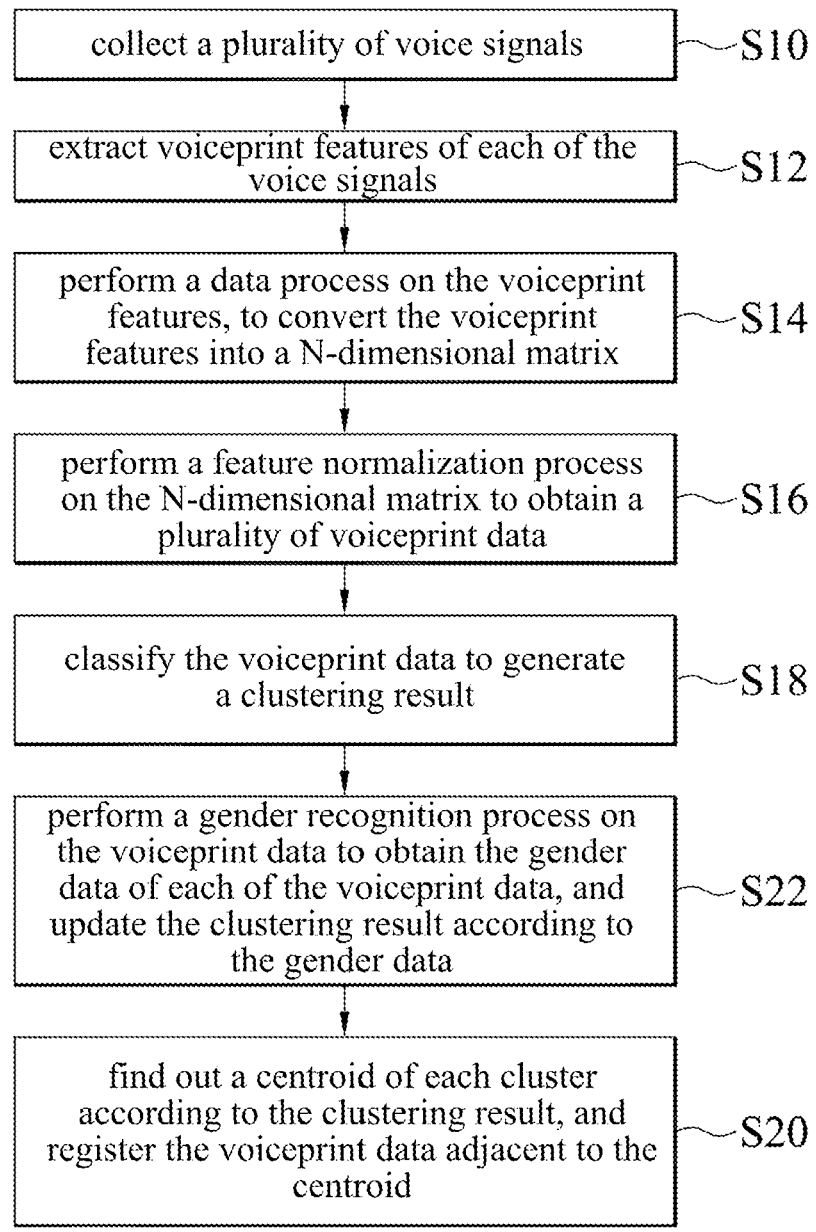
FIG. 8 is a schematic flow diagram of a voice recognition method according to another embodiment.

In an embodiment, as shown in FIG. 7, the software architecture in the processor 14 further includes a gender recognition module 146. The gender recognition module 146 is connected between the classification algorithm module 144 and the centroid calculation module 145. Please refer to FIG. 7 and FIG. 8, in step S18, after the step of the classification algorithm module 144 performs classifying on the voiceprint data to generate a clustering result, go to the step S22. The gender recognition module 146 performs a gender recognition process on the voiceprint data to eliminate a few inconsistent voiceprint data or noise, to obtain the gender data of each of the voiceprint data, updates the clustering result according to the gender data, and transmits the updated clustering result to the centroid calculation module 145. Then performs the calculation in step S20 to obtain the each cluster centroid and the voiceprint data adjacent to each of the cluster centroids to complete the registration. The rest of the steps and the detail description are the same as the previous embodiment, which is not repeated herein. In an embodiment, the gender recognition module 146 is trained through the gender database collected by itself.

In sum, a voice recognition method reducing the complexity of the user registration step, and learns the user's voiceprint characteristics through a small amount of voice signals from the user is provided. In the embodiments, a small amount of voice signals are used to register the user's voiceprint data and are accurately recognized, where reduces the complexity that a large number of voice signals needs to be collected in traditional methods. Furthermore, the problem of inconsistency between the experimental data and the actual verification data is solved. Since differences exist between the actual using voice and recorded voice in volume size, character, and environmental noise, the voice in user's actual environment is classified and recognized in the embodiments disclose herein, so as to solve the problem of the process that needs users to provide voices to register and the problem of inconsistency between the experimental data and the actual verification data.

In summary, the user's voiceprint data is registered and accurately recognized through a small amount of voice signals, and the voiceprint data is classified and recognized through the voice signals of the user's actual using environment. Therefore, the problem of the process that needs users to provide voices to register and the problem of inconsistency between the experimental data and the actual verification data are solved, and then the accuracy of recognition is improved.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A voice recognition method, comprising:
   collecting a plurality of voice signals;
   extracting voiceprint features of each of the voice signals;
   performing a data process on the voiceprint features, to convert the voiceprint features into a N-dimensional matrix, and N is an integer greater than or equal to 2;
   performing a feature normalization process on the N-dimensional matrix to scale the voiceprint features proportionally to fall within a specific interval to obtain a plurality of voiceprint data;
   classifying the voiceprint data to generate a clustering result; and
   finding out a centroid of each cluster according to the clustering result, and registering the voiceprint data adjacent to each of the centroid;
   wherein the step of classifying the voiceprint data further comprises:
      calculating a number of the clusters and adjacent slopes by an elbow method according to the voiceprint data;
      generating the clustering result of classification by a hierarchical clustering algorithm using the calculated number of clusters when the slope changes suddenly; and
      generating the clustering result of classification directly by the hierarchical clustering algorithm without using the calculated number of clusters when the slope does not change suddenly.

2. The voice recognition method according to claim 1, after the step of classifying the voiceprint data to generate the clustering result, further comprising:
   performing a gender recognition process on the voiceprint data to obtain a gender data of each of the voiceprint data, and
   updating the clustering result according to the gender data.

3. The voice recognition method according to claim 1, wherein the step of performing the data process on the voiceprint feature further comprises:
   using a t-distributed stochastic neighbor embedding (t-SNE) method to obtain the N-dimensional matrix.

4. The voice recognition method according to claim 1, wherein the hierarchical clustering algorithm is a balanced iterative reducing and clustering using hierarchies (BIRCH) method.

5. The voice recognition method according to claim 1, wherein the step of classifying the voiceprint data further comprises:
   dynamically adjusting a classifying threshold value according to the voiceprint features to classify the voiceprint data to generate the clustering result.

6. The voice recognition method according to claim 1, wherein the step of registering the voiceprint data adjacent to the centroid further comprises:
   recording the voiceprint data adjacent to each of the centroid and an identification number of the voiceprint data.

7. An electronic device, comprising:
   a sound receiver, configured to collect a plurality of voice signals; and
   a processor, electrically connected to the sound receiver and configured for:
      extracting voiceprint features of each of the voice signals;
      performing a data process on the voiceprint features to convert the voiceprint features into a N-dimensional matrix, where N is an integer greater than or equal to 2;
      performing a feature normalization process on the N-dimensional matrix to obtain a plurality of voiceprint data;
      classifying the voiceprint data to generate a clustering result; and
      finding out a centroid of each cluster according to the clustering result, and registering the voiceprint data adjacent to the centroid;
      wherein when the processor is classifying the voiceprint data, the processor further configures to perform:
         calculating a number of the clusters and adjacent slopes by an elbow method according to the voiceprint data;
         generating the clustering result of classification by a hierarchical clustering algorithm using the calculated number of clusters when the slope changes suddenly; and
         generating the clustering result of classification by the hierarchical clustering algorithm without using the calculated number of clusters when the slope does not change suddenly.

8. The electronic device according to claim 7, after generating the clustering result, the processor further configures to perform a gender recognition process on the voiceprint data to obtain a gender data of each of the voiceprint data, and to update the clustering result according to the gender data.

9. The electronic device according to claim 7, the processor further configures to use a t-distributed stochastic neighbor embedding (t-SNE) method to perform a dimensionality reduction process to obtain the N-dimensional matrix.

10. The electronic device according to claim 7, the hierarchical clustering algorithm is a balanced iterative reducing and clustering using hierarchies (BIRCH) method.

11. The electronic device according to claim 7, wherein when the processor is classifying the voiceprint data, the processor further dynamically adjusts a classifying threshold value according to the voiceprint feature to classify the voiceprint data to generate the clustering result.

12. The electronic device according to claim 7, wherein the processor further records the voiceprint data adjacent to each of the centroid and an identification number of the voiceprint data to complete the register.

* * * * *